Figure 2:
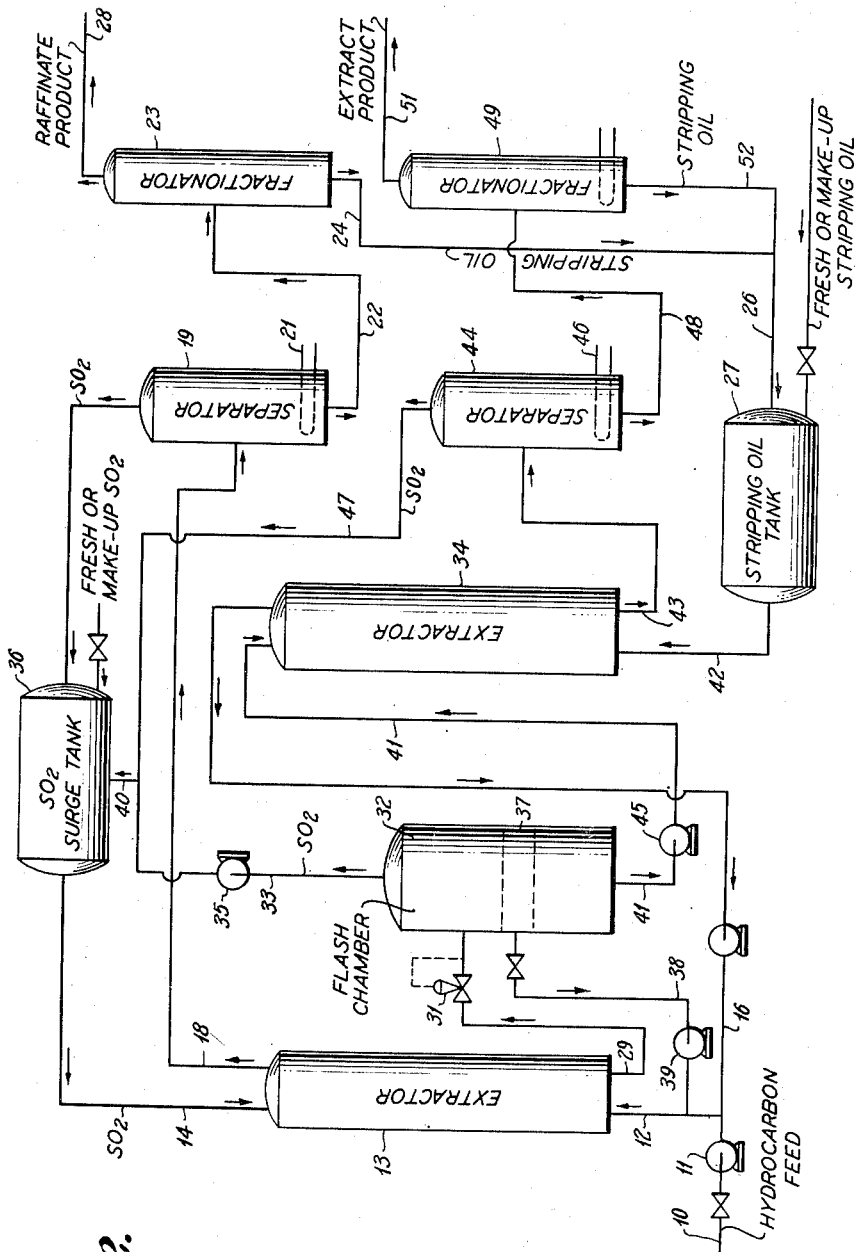

Jan. 29, 1957
G. H. DALE ET AL
2,779,709
EXTRACTION PROCESS
Filed Dec. 31, 1952
2 Sheets-Sheet 1
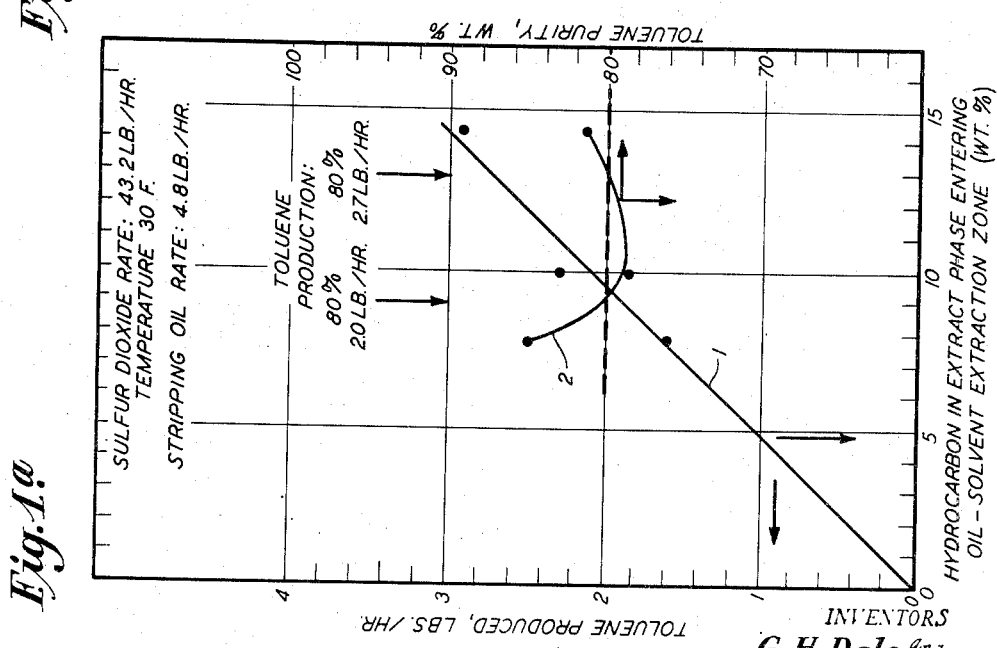
Fig. Aa.
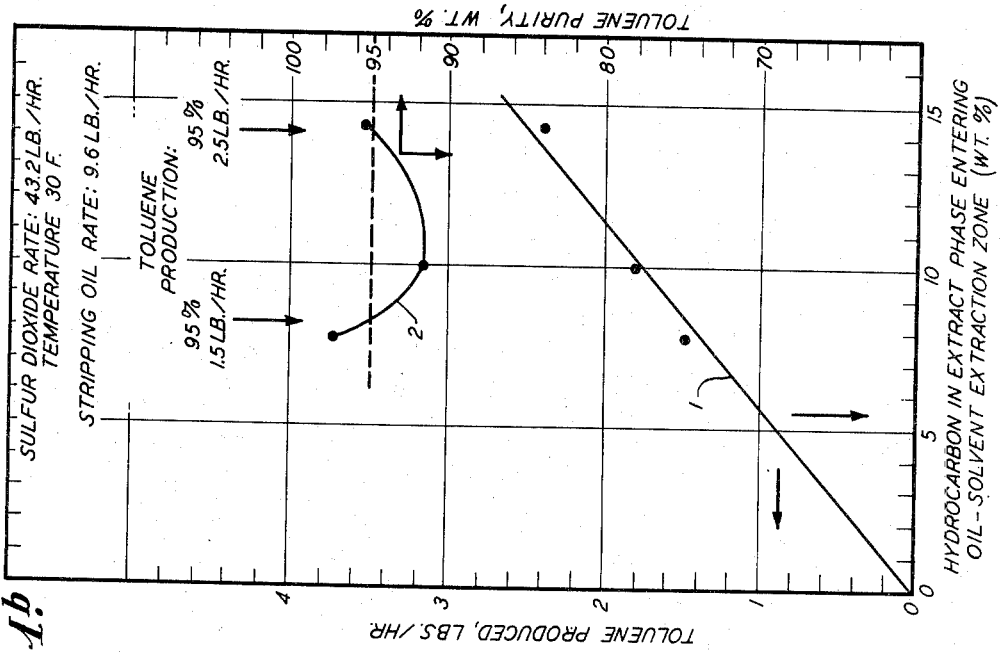
Fig. Ab.
INVENTORS
G. H. Dale and
R. O. Shelton
BY
Hudson and Young
ATTORNEYS

United States Patent Office 2,779,709
Patented Jan. 29, 1957

2,779,709

EXTRACTION PROCESS

Glenn H. Dale and Russell O. Shelton, Bartlesville, Okla., assignors to Phillips Petroleum Company, a corporation of Delaware Application December 31, 1952, Serial No. 329,020

15 Claims. (Cl. 196—14.19)

This invention relates to the solvent extraction of hydrocarbon mixtures. In one aspect this invention relates to a process employing sulfur dioxide in conjunction with a paraffinic or naphthenic stripping oil in the separation of aromatic hydrocarbon from petroleum fractions. In still another aspect this invention relates to a process wherein sulfur dioxide is removed from an extract phase formed during sulfur dioxide solvent extraction of a petroleum fraction, in an amount to cause residual extract to closely approach but not reach miscibility with a paraffinic stripping oil when contacted therewith in a subsequent extraction step, whereby maximum rate of production of a final aromatic extract or concentrate at a given purity level is achieved.

As disclosed in our copending application Serial No. 262,754, filed December 21, 1951, now Patent No. 2,724,682 in the sulfur dioxide solvent extraction of aromatic hydrocarbons from petroleum fractions, the solubility relationship between sulfur dioxide and aromatic hydrocarbons is altered by the presence of a paraffinic or naphthenic stripping oil. The latter, utilized as described hereinafter, operates substantially as an extraction solvent and as such extracts less aromatic constituents from the petroleum fraction treated to provide extract freed from paraffinic or naphthenic hydrocarbons to an extent markedly greater than that achieved by utilization of liquid sulfur dioxide alone as a selective solvent.

In one form of utilization of sulfur dioxide in conjunction with a stripping oil in the extraction of aromatics from a petroleum fraction, the extraction process is carried out in two steps. In the first step the charge stock is contacted with liquid sulfur dioxide in the presence or absence of a paraffinic or naphthenic stripping oil, as desired. In a second step extract phase from the first extraction step is contacted as a separate phase with a suitable stripping oil under which conditions a final extract phase is obtained, which when freed of solvent, constitutes an aromatic extract or "concentrate" of high purity, i. e., it has an aromatic content greater than that obtained when employing sulfur dioxide alone as an extraction solvent.

In accordance with our invention we provide a solvent extraction process comprising solvent extracting aromatics from a hydrocarbon fraction with sulfur dioxide alone as the selective solvent or in conjunction with a paraffin or naphthenic stripping oil; removing sulfur dioxide from resulting "primary" extract phase, in an amount to provide residual primary extract phase that approaches but does not reach complete miscibility with a paraffinic or naphthenic stripping oil to be contacted therewith; and contacting resulting residual primary extract phase with the stripping oil under solvent extraction conditions, thereby forming final aromatic extract or concentrate at a maximum rate of production at any given level of final extract purity.

Our invention is based on our discovery that, when solvent extracting an aromatic-containing hydrocarbon mixture, with liquid sulfur dioxide alone or in conjunction with a stripping oil, and then solvent extracting resulting primary extract phase with a stripping oil, the purity, i. e. aromatics content, of the final aromatic extract passes through a minimum as the proportion of hydrocarbon in the solvent treated primary extract phase is increased from that of the total primary extract phase to a concentration causing the residual primary extract phase to closely approach but not reach complete miscibility with the stripping oil. We have found as a result of our discovery that final extract at any given purity level can be produced when the concentration of hydrocarbon in the solvent treated residual primary extract phase is at either one of two possible values; and further, that the rate of production of the final aromatic extract is markedly higher when the concentration of hydrocarbon in the solvent treated residual primary extract phase is the higher of its two possible values.

Accordingly our invention provides for the removal of sulfur dioxide from total primary extract phase in an amount so that the concentration of hydrocarbon in the resulting residual primary extract is of a value sufficiently high that when the residual primary extract phase is solvent extracted with stripping oil, final extract product will be produced at the higher of the two possible production rates, thereby providing for a maximum rate of production of final extract product at any given level of purity.

Our invention is graphically illustrated in Figure 1 of the drawings with reference to a toluene-normal heptane mixture. Figures 1a and 1b illustrate that in the solvent extraction with a paraffinic stripping oil of an extract containing normal heptane in a weight ratio to toluene of about 1:1 and recovered from liquid sulfur dioxide extraction of a toluene-normal heptane mixture at a given stripping oil rate, the purity of the final extract, i. e., product of stripping oil extraction, passes through a minimum as the concentration of hydrocarbon in the primary extract phase, increases from that of the initial primary extract to a value just short of causing the primary extract to be completely miscible with stripping oil in the stripping oil solvent extraction step. Figures 1a and 1b further illustrate our discovery that final extract product at any given purity level can be produced at two possible rates, each dependent upon the concentration of hydrocarbon in the primary extract introduced into the stripping oil extraction system. Figure 1 shows total toluene production (curves 1) and the toluene purity (curves 2) for varying concentrations of hydrocarbon in the primary extract material that is solvent extracted with stripping oil. Figure 1a is based on a stripping oil rate of 4.8 pounds per hour and a sulfur dioxide rate of 43.2 pounds per hour, and Figure 1b on a stripping oil rate of 9.6 pounds per hour and a sulfur dioxide rate of 43.2 pounds per hour, the temperature in each case being 30° F. Thus, Figure 1b shows that 95 percent toluene can be produced at a rate of 1.5 pounds per hour if the hydrocarbon content of the primary extract phase treated is 8.2 weight percent, but that, if the said hydrocarbon content is increased to 14.1 weight percent, the 95 percent toluene is produced at a rate of 2.5 pounds per hour. Accordingly, when the primary extract has the higher hydrocarbon content, rate of production of the final 95 percent purity extract product is more than 65 percent greater than the rate of production obtained when the said hydrocarbon content is the lower of the two values. Similarly, Figure 1a shows that 80 percent toluene can be produced at a rate of about 2 pounds per hour when the hydrocarbon content of the extract phase treated is 9 weight percent hydrocarbon but that, when the hydrocarbon content of the primary extract treated is 13 weight percent hydrocarbon, the 80 percent toluene is produced at a rate of 2.7 pounds per hour, which is an increase in rate of production of 80 percent toluene of about 35 percent.

Sulfur dioxide removal from the primary extract phase, as illustrated in Figure 1, can be regulated to effect varying degrees of approach to miscibility of residual primary extract with stripping oil in the final extraction step, production at the maximum of two possible rates being obtained at any given purity level so long as the proportion of hydrocarbon in residual extract treated is not less than that at which the minimum purity of final extract is obtained. Accordingly, when referring herein to the step of increasing the proportion of hydrocarbon in primary extract to a value causing resulting residual extract to approach miscibility with stripping oil in the subsequent extraction step, it is meant to remove at least a sufficient amount of sulfur dioxide to provide a concentration of hydrocarbon in the residual extract to be further treated, sufficiently high that the purity of the final extract product is greater than its minimum possible value. Preferably we form residual primary extract by removal of the maximum permissible proportion of sulfur dioxide so as to utilize maximum permissible hydrocarbon concentrations to achieve not only a maximum rate of production of final extract product at a given purity level but also to achieve maximum product purity.

Our invention is further illustrated with reference to Figure 2 of the drawings, which is a diagrammatic flow sheet setting forth a preferred embodiment of our process. Referring to Figure 2, a hydrocarbon feed mixture containing aromatic hydrocarbons is introduced through line 10 via pump 11 and line 12 into a lower portion of extractor 13 and countercurrently contacted therein with liquid sulfur dioxide from surge tank 36 introduced into an upper portion of extractor 13 through line 14. Also introduced into extractor 13 via line 12 is a paraffinic or naphthenic stripping oil from recycle line 16, preferably boiling in a range above that of the hydrocarbon feed introduced into extractor 13 from line 10. Extractor 13 is maintained under conditions for effecting solvent extraction of aromatic hydrocarbons from the hydrocarbon feed mixture charged, and is generally operated under a pressure sufficiently high to maintain all materials therein in liquid phase and at a temperature within the range of about 30 to 70° F., more generally from about 30-40° F. Total raffinate is withdrawn from an upper portion of extractor 13 via line 18 and passed to separation chamber 19. Sulfur dioxide is separated from raffinate in chamber 19, e. g., by heat from steam coil 21. Sulfur dioxide-free raffinate is withdrawn from chamber 19 and passed via line 22 into raffinate fractionator 23. Stripping oil in fractionator 23 is withdrawn through line 24 and passed via line 26 into stripping oil tank 27. Raffinate product is withdrawn from fractionator 23 via line 28.

Total primary extract phase is withdrawn from a lower portion of extractor 13 via line 29 and passed through pressure control valve 31 into sulfur dioxide flash chamber 32, wherein a controlled portion of the sulfur dioxide component is flashed therefrom. Sulfur dioxide removed from primary extract in flash chamber 32 is withdrawn via line 33 and passed via pump 35 through line 40 into sulfur dioxide surge tank 36. Sulfur dioxide is removed from total primary extract in chamber 32 in an amount so as to provide residual primary extract phase having a hydrocarbon content sufficiently high that, when the resulting residual extract phase is solvent extracted with a stripping oil in a subsequent step (extractor 34), the said residual extract will closely approach but will not reach complete miscibility with the stripping oil. In other words, it is the purpose of the operation of chamber 32 to increase the hydrocarbon content of the primary extract phase from extractor 13 to a point just short of causing the resulting residual phase to reach complete miscibility with the stripping oil in extractor 34. Due to the removal of a portion of the sulfur dioxide from the primary extract a small amount of hydrocarbon may separate as layer 37 therefrom, which is withdrawn via line 38 and pump 39 and recycled via line 12 to extractor 13. Residual extract phase in chamber 32 is withdrawn via line 41 and pump 45 and passed into an upper portion of extractor 34 and contacted countercurrently therein with paraffinic stripping oil introduced into a lower portion of extractor 34 from tank 27 via line 42, the said stripping oil having a boiling range above that of feed in line 10, as described hereinabove. Extractor 34 is maintained under conditions for effecting solvent extraction of less-aromatic components from residual primary extract therein, thus providing for a final extract phase of increased aromatics content, which is withdrawn from a lower portion of extractor 34 through line 43 and passed to separation chamber 44. Solvent extraction in extractor 34 is operated in liquid phase at a temperature generally in the range of 30–50° F., preferably about 30–40° F., although temperatures outside this range can be employed if desired, particularly higher temperatures. The ratio of stripping oil to residual primary extract phase introduced into extractor 34 can be varied over a wide range as desired, as for example a weight ratio within the range of 0.05:1 to 0.50:1, although higher ratios outside such a range can be employed if desired.

Sulfur dioxide is separated from extract product in separator 44, e. g., by heat supplied by a steam coil 46. Sulfur dioxide is withdrawn from separator 44 via line 47 and passed through line 40 into sulfur dioxide surge tank 36. Residual extract in chamber 44 is withdrawn therefrom and passed through line 48 into extract fractionator 49, wherein stripping oil is separated from the residual extract, the latter being withdrawn from fractionator 49 through line 51. Stripping oil separated in fractionator 49 is withdrawn through line 52 and passed via line 26 into stripping oil tank 27.

The stripping oil useful in our process may be a straight run hydrocarbon oil, as for example a low viscosity lubricating oil fraction, or it may be a kerosene or gas-oil. The oil may contain both paraffinic and naphthenic hydrocarbons or may be completely paraffinic or naphthenic in nature. Naphthenic hydrocarbons are cycloparaffinic hydrocarbons, and accordingly the generic term paraffinic hydrocarbon as applied to the stripping oil and used in this specification and claims is intended to include straight chain paraffinic, isoparaffinic and/or naphthenic type hydrocarbon oils.

The stripping oil also should possess an initial boiling point somewhat higher than the end boiling point of any of the hydrocarbons being treated, since if there is an overlapping of boiling points, feed stock hydrocarbons may accumulate in the stripping oil or stripping oil hydrocarbons may be removed from the system in one of the hydrocarbon products. The distillation end point of the stripping oil is not particularly critical, but when this temperature is too high, freezing points of high boiling constituents may disadvantageously limit desirably low operating temperatures. A particularly suitable paraffinic oil is a vacuum distillate oil having a viscosity somewhat less than that of an SAE 10 motor oil, and having an initial boiling point of about 600° F. We find that an oil of this type is very satisfactory as a stripping oil in carrying out our invention.

Our invention is preferably applied to the solvent extraction of gasoline range boiling hydrocarbons although applicable to heavier hydrocarbons such as those boiling in the kerosene range. Exemplary of hydrocarbon fractions to which our invention is particularly applicable are catalytically reformed gasolines and thermally cracked naphthas.

Although the hydrocarbon concentration in the residual primary extract to be solvent extracted with stripping oil in extractor 34 is largely dependent upon the particular aromatic feed stock introduced into the system, the maximum permissible hydrocarbon concentration is generally below 20 weight percent. When solvent extracting hydrocarbon mixtures boiling in the gasoline range, the maximum permissible hydrocarbon concentration will often be somewhat greater than 15 weight percent particularly for hydrocarbons of higher molecular weight. A minimum hydrocarbon concentration in the residual primary extract is often advantageously about 5 weight percent. When olefins are present in the hydrocarbon feed mixture or when higher extraction temperatures are employed in extractor 34, the maximum permissible hydrocarbon concentration in the residual primary extract is somewhat smaller.

Our invention is further illustrated by way of the following data characteristic of solvent extraction of a toluene-normal heptane mixture charged to our process of Figure 2. The data, descriptive of stream compositions, are associated with designated elements of Figure 2 and are expressed in terms of pounds per hour.

| Components | 10 | 43 | 18 | 14 | 42 | 29 | 33 | 41 | 12 | 38 |
|---|---|---|---|---|---|---|---|---|---|---|
| Toluene | 5.4 | 4.8 | 0.6 | | | 7.2 | | 7.1 | 7.8 | 0.1 |
| N-Heptane | 20.0 | 0.2 | 19.8 | | | 7.4 | | 7.2 | 27.2 | 0.2 |
| Sulfur Dioxide | | 78.0 | 20.0 | 195.0 | | 182.8 | 97.0 | 85.7 | 7.8 | 0.1 |
| Stripping Oil | | | 1.8 | 17.2 | | 19.0 | 3.0 | | 1.4 | 20.2 | 1.6 |

Variation and modification are possible within the scope of the foregoing disclosure and the appended claims to this invention, the essence of which is that in the sulfur dioxide extraction of aromatic hydrocarbons from a petroleum fraction, wherein the feed fraction is contacted in a first stage with liquid sulfur dioxide in the presence if desired, of a stripping oil, and resulting extract is then passed to a second stage and solvent extracted therein with a stripping oil, a controlled portion of sulfur dioxide is removed from the first stage total extract prior to its introduction into the second stage, in an amount such that residual extract approaches but does not reach complete miscibility with the second stage stripping oil, whereby a maximum rate of production of aromatics is obtained at any given aromatics purity level.

We claim:

1. In a sulfur dioxide solvent extraction process in which a primary extract phase formed is contacted with a paraffinic stripping oil which is substantially free of sulfur dioxide to produce a final extract product, the improvement which comprises removing sulfur dioxide from said primary extract phase in an amount to form a residual primary extract phase which is less than completely miscible with said stripping oil, and then contacting with said stripping oil said residual primary extract phase, in the condition in which it is obtained and while maintaining it in its said less than complete miscibility condition with said stripping oil, stripping said primary extract phase with said stripping oil while it is maintained in its said condition, and separating a phase containing said stripping oil and a stripped extract phase each from the other.

2. In a process for the recovery of aromatics from a petroleum fraction containing the same and comprising the steps of solvent extracting such a fraction with liquid sulfur dioxide solvent, solvent extracting the resulting primary extract phase with a paraffinic stripping oil which is substantially free of sulfur dioxide, and recovering the resulting aromatic extract as a product of the process, the improvement which comprises increasing the proportion of aromatic hydrocarbons in the said primary extract phase prior to said stripping oil solvent extraction step by removal of sulfur dioxide to form an extract phase which is less than completely miscible with the said stripping oil, then contacting said extract phase with said stripping oil while maintaining it in said less than completely miscible condition with said stripping oil, and separating a phase containing said stripping oil and a stripped extract phase each from the other.

3. In a sulfur dioxide solvent extraction process in which the primary extract phase formed is contacted with a paraffinic stripping oil which is substantially free of sulfur dioxide to produce a final extract product, the improvement which comprises removing a determined quantity of sulfur dioxide from said extract phase, determining said quantity removed by removing $SO_2$ from said extract phase until the purity of the aromatic oil recovered, when all $SO_2$ has been separated from said phase, following its later treatment with a paraffinic stripping oil, begins to decrease and then reaches a minimum, continuing the removal of sulfur dioxide from said phase until said purity of said oil recovered has increased appreciably beyond said minimum, and then stripping the residual primary extract phase thus obtained with said paraffinic stripping oil while maintaining said residual primary extract phase in the condition which it has reached when said determined quantity of $SO_2$ has been removed.

4. In a sulfur dioxide solvent extraction process in which the primary extract phase formed is contacted with a paraffinic stripping oil which is substantially free of sulfur dioxide to produce a final extract product, the improvement which comprises removing a determined quantity of sulfur dioxide from said extract phase, determining said quantity removed by removing $SO_2$ from said extract phase until the purity of the aromatic oil recovered, when all $SO_2$ has been separated from said phase, following its later treatment with a paraffinic stripping oil, begins to decrease and then reaches a minimum, continuing the removal of sulfur dioxide from said phase until said purity of said oil recovered has increased substantially beyond said minimum, and then stripping the residual primary extract phase thus obtained with said paraffinic stripping oil while maintaining said residual primary extract phase in the condition which it has reached when said determined quantity of $SO_2$ has been removed.

5. In a process for the recovery of aromatics from a petroleum fraction containing the same, in which said petroleum fraction is extracted with a liquid sulfur dioxide solvent, the steps comprising extracting the resulting extract phase with a paraffinic stripping oil which is substantially free of sulfur dioxide and also comprising the steps as follows: removing a determined quantity of sulfur dioxide from said extract phase, determining the quantity of $SO_2$ to be removed by removing $SO_2$ and plotting rate of production and purity of a final aromatic extract, obtained after contact with said stripping oil, for each residual primary extract phase concentration, thus obtaining a curve which passes through a minimum value as the concentration of hydrocarbon in the extract phase is increased and then contacting an extract phase from which said determined quantity of $SO_2$ has been removed and which is represented by a point on said curve above said minimum value with said stripping oil, thus producing a final aromatic extract product at one of two possible production rates at the purity level at which said extract phase from which sulfur dioxide has been removed has been selected.

6. In a process for the recovery of aromatics from a petroleum fraction containing the same, in which said petroleum fraction is extracted with a liquid sulfur dioxide solvent, the steps comprising extracting the resulting extract phase with a paraffinic stripipng oil which is substantially free of sulfur dioxide and also comprising the steps as follows: removing a determined quantity of sulfur dioxide from said extract phase, determining the quantity of sulfur dioxide to be removed by removing sulfur dioxide and plotting rate of production and purity of a final aromatic extract, obtained after contact with said stripping oil, for each residual primary extract phase concentration, thus obtaining a curve which passes through a minimum value as the concentration of hydrocarbon in the extract phase is increased and then contacting an extract phase from which said determined quantity of $SO_2$ has been removed and which is represented by a point on said curve above said minimum value on the positive slope portion of said curve, with said stripping oil, thus producing a final aromatic extract product at the maximum rate possible at said purity level.

7. In a sulfur dioxide solvent extraction process in which the primary extract phase formed is contacted with a paraffinic stripping oil which is substantially free of sulfur dioxide to produce a final extract product, the improvement which comprises determining the quantity of sulfur dioxide to be removed from the extract phase to obtain a resulting extract phase which is less than completely miscible with the said stripping oil, removing said quantity of sulfur dioxide from said primary extract phase, and stripping said primary extract phase while maintained in its said less than complete miscibility condition with only the said stripping oil.

8. A process of claim 2 wherein said petroleum fraction contains normal heptane and toluene.

9. A process of claim 2 wherein said petroleum fraction boils in the gasoline range.

10. A process of claim 2 wherein said petroleum fraction boils not higher than the kerosene boiling range.

11. A process of claim 2 wherein the first said solvent extraction is conducted at a temperature within the range of 30 to 70° F.

12. A process of claim 2 wherein the last said solvent extraction is effected at a temperature within the range of 30 to 70° F.

13. A process of claim 2 wherein said stripping oil has a boiling range above about 600° F.

14. A process of claim 2 wherein the initial boiling point of said stripping oil is above the boiling range of said petroleum fraction.

15. A process of claim 2 wherein the maximum concentration of aromatic hydrocarbon in said residual extract does not exceed 20 weight percent.

References Cited in the file of this patent

UNITED STATES PATENTS

| | | |
|---|---|---|
| 2,114,524 | Egli | Apr. 19, 1938 |
| 2,410,166 | Kimball | Oct. 29, 1946 |

FOREIGN PATENTS

| | | |
|---|---|---|
| 441,104 | Great Britain | Jan. 13, 1936 |